(12) United States Patent
Bohan et al.

(10) Patent No.: US 11,888,303 B2
(45) Date of Patent: Jan. 30, 2024

(54) BUSBAR CONNECTION SYSTEMS AND METHODS

(71) Applicant: APTIV TECHNOLOGIES LIMITED, St. Michael (BB)

(72) Inventors: Andrew Bohan, Warren, OH (US); Jonathan D. Weidner, Conneautville, PA (US); Keith B. Adkins, Warren, OH (US); Nicholas A. Durse, Youngstown, OH (US); Adam Wolfgang, Petersburg, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 554 days.

(21) Appl. No.: 16/944,806

(22) Filed: Jul. 31, 2020

(65) Prior Publication Data
US 2022/0037870 A1  Feb. 3, 2022

(51) Int. Cl.
*H01H 85/20* (2006.01)
*H02G 5/00* (2006.01)
*H02G 5/02* (2006.01)

(52) U.S. Cl.
CPC .......... *H02G 5/025* (2013.01); *H01H 85/205* (2013.01); *H02G 5/002* (2013.01)

(58) Field of Classification Search
CPC ........ H01H 85/205; H01H 85/20; H01R 4/50; H01R 4/304; H01R 4/62; H02G 5/002; H02G 5/025; H02G 5/00; H02G 5/02
USPC ..... 174/149 B, 16.2, 68.2, 72 B, 71 B, 88 B, 174/99 B, 129 B, 133 B
See application file for complete search history.

(56) References Cited

U.S. PATENT DOCUMENTS

| | | | |
|---|---|---|---|
| 3,384,856 A | * | 5/1968 | Fisher ............... H02G 5/08 174/68.2 |
| 8,992,268 B2 | | 3/2015 | Casses et al. |
| 10,084,260 B2 | | 9/2018 | Fabre et al. |
| 10,403,462 B2 | | 9/2019 | Allcorn et al. |
| 2019/0337470 A1 | | 11/2019 | Kot et al. |
| 2020/0389005 A1 | * | 12/2020 | Koizumi ............ H02G 5/005 |

FOREIGN PATENT DOCUMENTS

| | | | |
|---|---|---|---|
| CN | 2422766 Y | * | 3/2001 |
| CN | 210640662 U | * | 5/2020 |
| DE | 102015216380 A1 | * | 3/2017 |
| JP | 2002070162 A | * | 3/2002 |
| KR | 200395579 Y1 | * | 9/2003 |
| KR | 20100002038 U | | 2/2010 |

OTHER PUBLICATIONS

Benefits of Stainless Steel_ASSDA_p. 1_Jan. 2021.*

* cited by examiner

*Primary Examiner* — Timothy J Thompson
*Assistant Examiner* — Guillermo J Egoavil
(74) *Attorney, Agent, or Firm* — Miller Johnson (57) ABSTRACT

A busbar connection system comprises a plate member formed of a first material having a higher tensile strength than second and third materials of first and second busbars, respectively, and defining first and second apertures and first and second stud members securely inserted through the first and second apertures of the plate member, respectively, the first and second stud members being configured to be securely inserted through first and second apertures, respectively, in each of the first and second busbars, wherein the first and second stud members mitigate rotational movement between the first and second busbars when connected.

11 Claims, 6 Drawing Sheets

BUSBAR CONNECTION SYSTEMS AND METHODS

FIELD

The present disclosure generally relates to electrical busbars and, more particularly, to busbar connection systems and methods.

BACKGROUND

A busbar is a metallic strip or bar for high current power distribution. Busbars are typically made of copper or aluminum and are generally uninsulated and have sufficient stiffness to be supported within air-based environments. This provides for improved cooling performance while also allowing for many different connection points along the busbars. Conventional solutions for connecting two or more busbars include forming an aperture through each of the busbars, through which a mechanical device (e.g., a screw or bolt) is then inserted. These conventional solutions suffer from the busbars being able to rotate relative to each other when connected. This could result in damage and/or degraded performance, and could be particularly problematic in applications where significant vibration occurs, such as in electrified vehicles where a large amount of installation torque is required. One other conventional solution to this problem is to use larger mechanical devices and/or backer plates, but this increases costs, weight, and packaging size, which are particularly valuable for applications such as electrified vehicles.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a busbar connection system is presented. In one exemplary implementation, the busbar connection system comprises: a plate member formed of a first material having a higher tensile strength than second and third materials of first and second busbars, respectively, and defining first and second apertures, and first and second stud members securely inserted through the first and second apertures of the plate member, respectively, the first and second stud members being configured to be securely inserted through first and second apertures, respectively, in each of the first and second busbars, wherein the first and second stud members mitigate rotational movement between the first and second busbars when connected.

In some implementations, the plate member defines a substantially rectangular shape and the first and second stud members are arranged along a longer central axis of the plate member. In some implementations, the plate member defines a substantially square shape and the first and second stud members are arranged in two diagonally opposing corner regions of the plate member.

In some implementations, the second and third materials are aluminum or copper. In some implementations, the first material is stainless steel.

In some implementations, a busbar assembly is presented and comprises the first busbar, the second busbar, and the busbar connection system. In some implementations, an electrical system of an electrified vehicle is presented and comprises the busbar assembly.

According to another aspect of the present disclosure, a method of securely connecting two or more busbars is presented. In one exemplary implementation, the method comprises: obtaining a first busbar formed of a first material, obtaining a second busbar formed of a second material, obtaining a plate member formed of a third material having a higher tensile strength than the first and second materials and defining first and second apertures, forming first and second apertures through each of the first and second busbars, aligning the first apertures of the first and second busbars and the plate member and securely inserting a first stud member therethrough, and aligning the second apertures of the first and second busbars and the plate member and securely inserting a second stud member therethrough, wherein the first and second stud members mitigate rotational movement between the first and second busbars when connected.

In some implementations, the plate member defines a substantially rectangular shape and the first and second stud members are arranged along a longer central axis of the plate member. In some implementations, the plate member defines a substantially square shape and the first and second stud members are arranged in two diagonally opposing corner regions of the plate member.

In some implementations, the first and second materials are aluminum or copper. In some implementations, the third material is stainless steel.

In some implementations, the method further comprises installing the first and second busbars in an electrical system. In some implementations, the electrical system is an electrical system of an electrified vehicle.

According to another aspect of the present disclosure, a busbar assembly for an electrified vehicle is presented. In one exemplary implementation, the busbar assembly comprises: a first busbar formed of a first material and defining first and second apertures, a second busbar formed of a second material and defining third and fourth apertures that correspond to the first and second apertures, respectively, and a connection system comprising a plate member formed of a third material having a higher tensile strength than the first and second materials and defining fifth and sixth apertures, a first stud member securely inserted through the fifth aperture of the plate member and the first and third apertures of the first and second busbars, respectively, and a second stud member securely inserted through the sixth aperture of the plate member and the second and fourth apertures of the first and second busbars, respectively, wherein the connection system mitigates rotational movement between the first and second busbars when connected.

In some implementations, the plate member defines a substantially rectangular shape and the first and second stud members are arranged along a longer central axis of the plate member. In some implementations, the plate member defines a substantially square shape and the first and second stud members are arranged in two diagonally opposing corner regions of the plate member.

In some implementations, the first and second materials are aluminum or copper. In some implementations, the third material is stainless steel.

In some implementations, an electrical system of the electrified vehicle is presented and comprises the busbar assembly.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, conventional busbar connection systems suffer from the busbars being able to rotate relative to each other during vibration or high torque installation or from needing to incorporate larger mechanical devices and/or backer plates to remedy this, which increases costs, weight, and/or packaging size. Accordingly, improved busbar connection systems and corresponding methods of connection and installation are presented. These systems and methods provide for mitigated rotational movement between two or more busbars. The term "rotational movement" as used herein refers to the degree by which two connected busbars (i.e., stacked flat atop each other) are able to rotate relative to each other. Mitigating or eliminating this type of movement is important for preventing potential damage and optimizing electrical performance. Applications having high degrees of vibration or requiring high torque installations, such as in an electrified vehicle 10 (see FIG. 1), are more likely to benefit from this mitigated rotational movement. In addition, it is desirable to achieve this benefit with minimal additional hardware to optimize costs, weight, and packaging size, which is at a premium in complex electrified vehicles.

Figure 1:
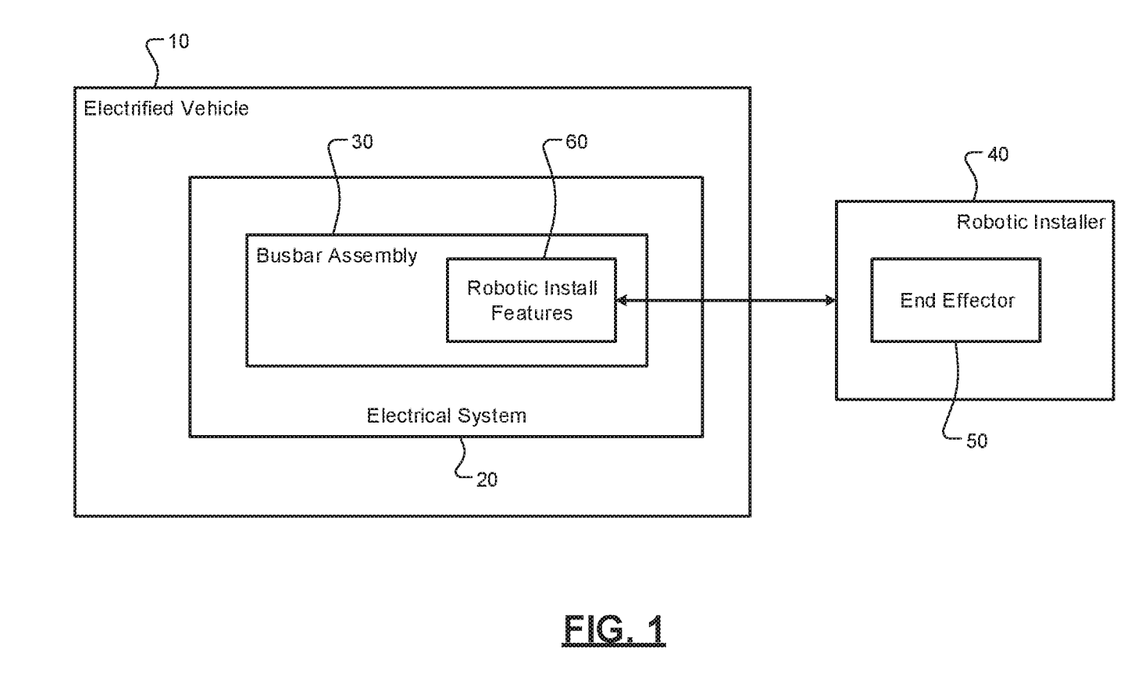
FIG. 1 depicts a functional block diagram of an example electrified vehicle having an example busbar assembly assembled and installed therein according to the principles of the present disclosure.
Figure 2A:
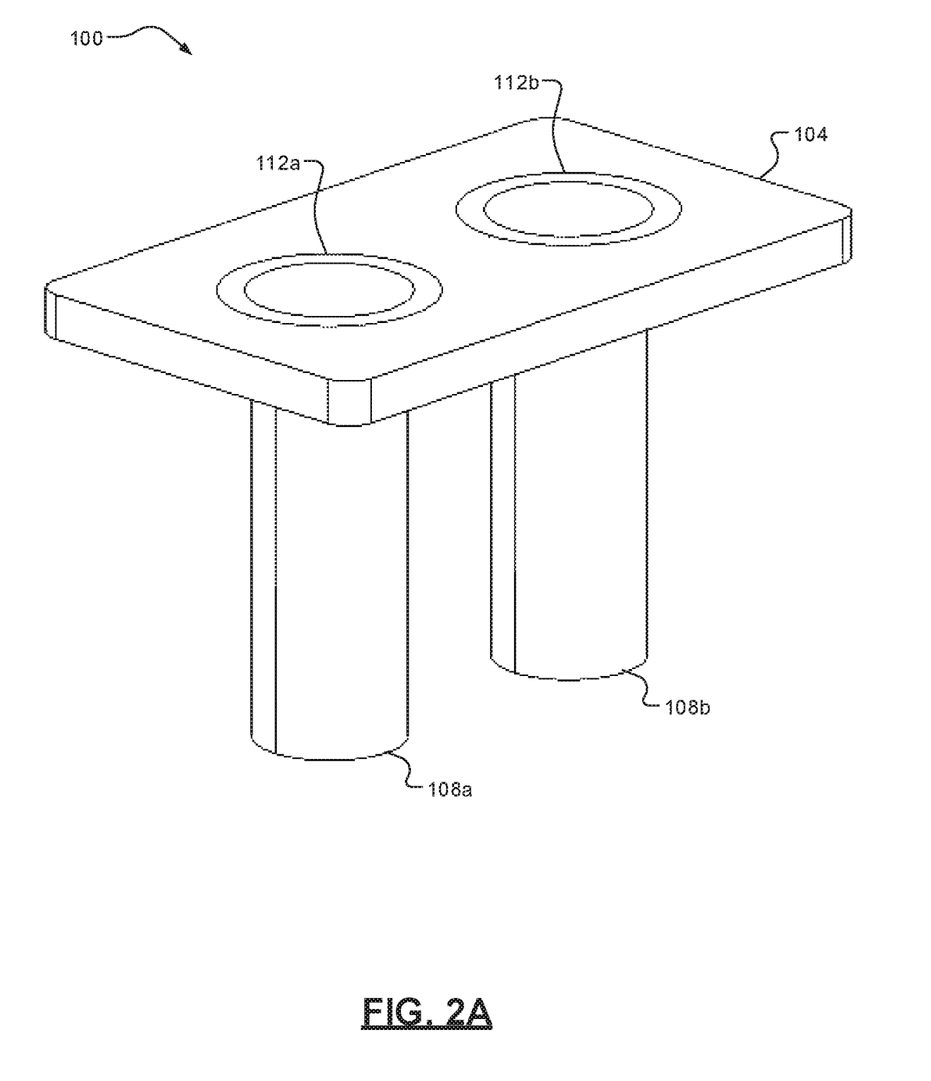
FIG. 2A depicts a view of an example connection system for two or more busbars according to the principles of the present disclosure.
Figure 2B:
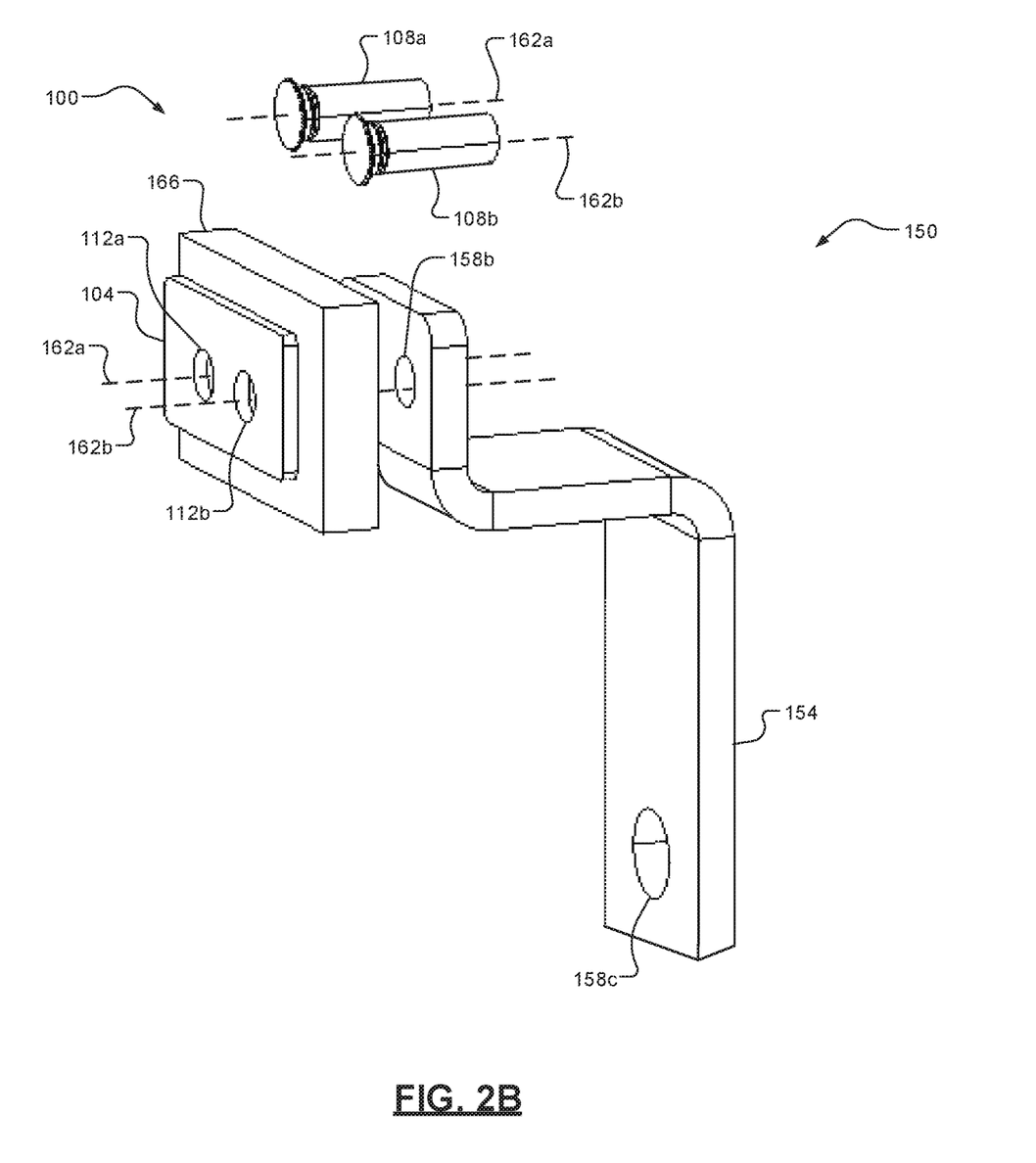
FIGS. 2B-2C depict views of an example busbar assembly securely connected via the connection system according to the principles of the present disclosure.
Figure 2C:
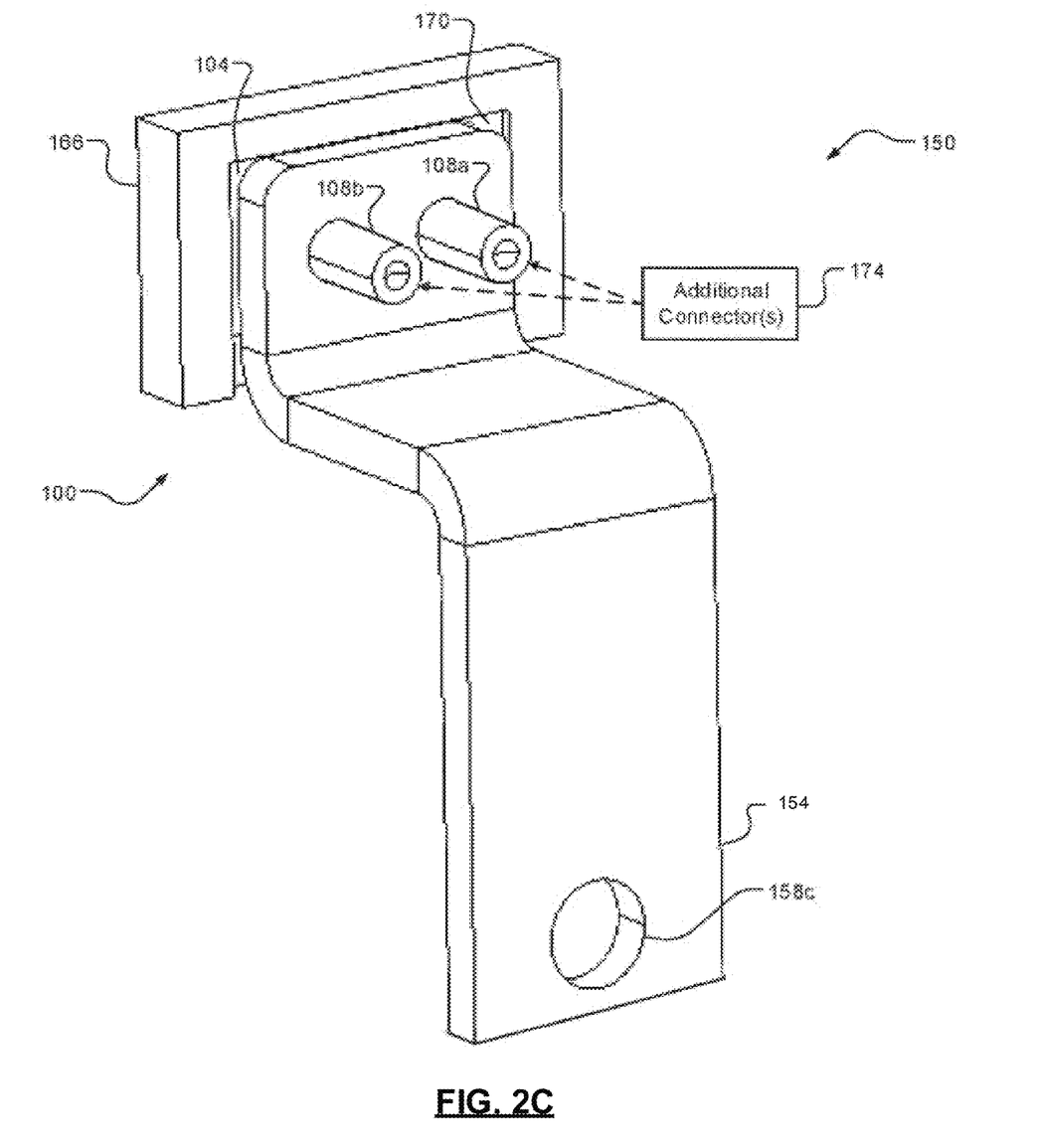

Referring now to FIGS. 2A-2C, an example busbar connection system 100 and an example busbar assembly (30 in FIG. 1; hereinafter, "busbar assembly 150") according to the principles of the present disclosure are illustrated. The busbar connection system 100 generally comprises a plate member 104 (also known as a "backer plate") and first and second stud members 108a, 108b inserted through respective apertures 112a, 112b defined by the plate member 104. While not shown in FIG. 1A and while only a single busbar 154 is shown in FIGS. 1B-1C, it will be appreciated that the stud members 108a, 108b are configured to be securely inserted through two or more busbars (e.g., busbar 154 and another busbar stacked flat atop each other; hereinafter referred to collectively as "busbars 154"). In FIG. 1B, an exploded view of the busbar assembly 150 is illustrated. The busbars 154 each define first and second apertures 158a, 158b through which the first and second stud members 108a, 108b are securely inserted (e.g., along axes 162a, 162b). An optional cover 166 defines a cavity 170 for housing and protecting or insulating the plate member 104.

The plate member 104 is formed of a material having a higher tensile strength than the materials of the busbars 154. In one exemplary implementation, the busbars 154 are formed of copper, aluminum, each of which provides for superior electrical performance, or some combination thereof (e.g., one copper and one aluminum), and the plate member 104 is formed of stainless steel. The galvanization of the stainless steel provides protection from rust or other wear overtime (e.g., caused by the high current flows). It will be appreciated that the stud members 108a, 108b could be formed of the same or a similar material as the plate member 104. In one exemplary implementation, the stud members 108a, 108b are forcefully inserted through the apertures 158a, 158b, which are somewhat malleable, and a wider or tapered portion of the stud members 108a, 108b prevents them from being easily removed from the apertures 158a, 158b. This is also known as a press-in style stud. It will be appreciated, however, that there could be other connector devices 174 for securing the stud members 108a, 108b. One non-limiting example of these other connector devices 174 is threated nuts on the ends of threaded screw or bold-type stud members 108a, 108b. For example only, the stud members 108a, 108b could be M5 threaded studs, which are each smaller than a single M6 threaded stud, which could correspond to larger aperture 158c as shown along the busbar 154.

Figure 3A:
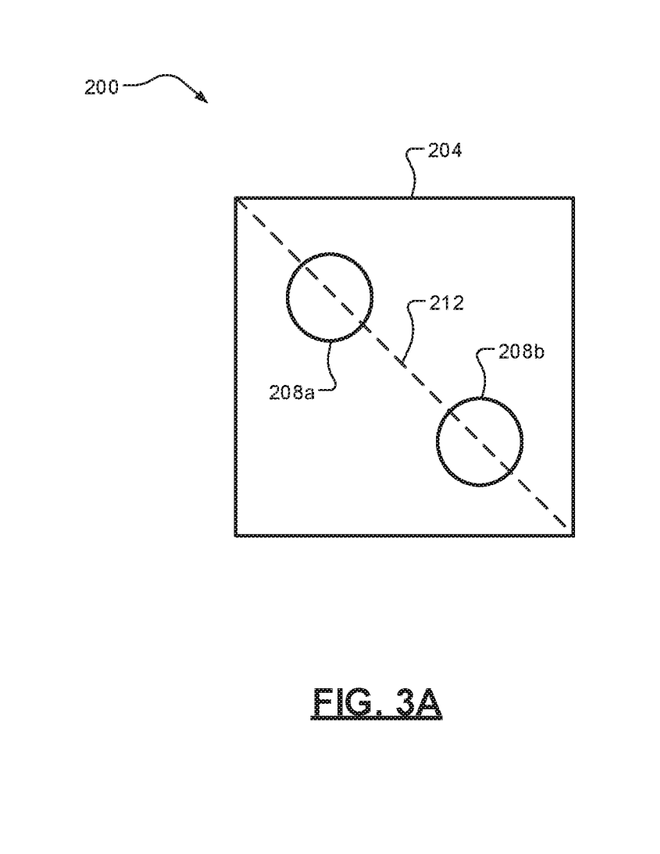
FIGS. 3A-3B depict example configurations for plate member apertures according to the principles of the present disclosure.
Figure 3B:
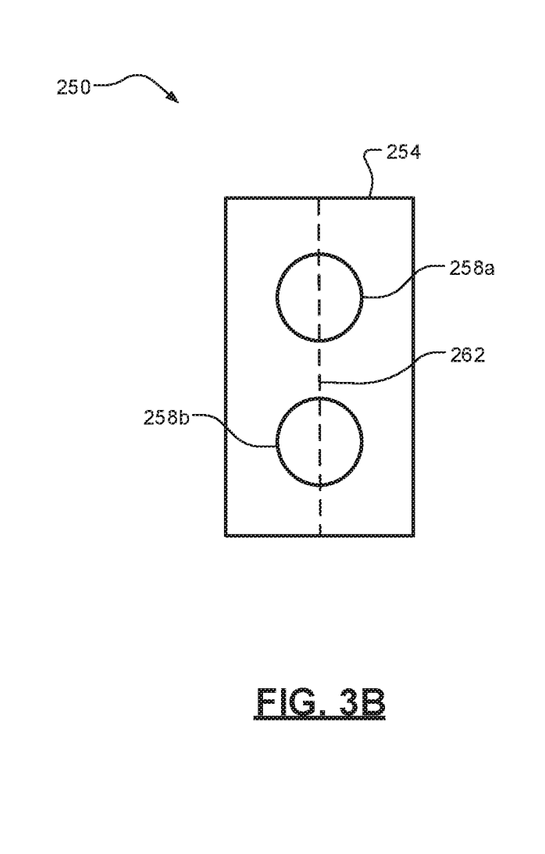

Referring now to FIGS. 2A-2B, two example configurations 200, 250 of the plate member 104 are illustrated. In FIG. 2A, a square-shaped configuration 200 of a plate member 204 is illustrated. In this configuration 200, the apertures 208a, 208b are arranged in diagonally opposing corners of the plate member 204 (e.g., along diagonal intersecting line 212). In FIG. 2B, a rectangular-shaped configuration 250 of a plate member 254 is illustrated. In this configuration 250, the apertures 258a, 258b are arranged alone a longer central axis 262 of the plate member 254. Either of these configurations could be utilized, for example, depending on the installation configuration. For example, the second configuration 250 could be preferable for an installation where space is limited in one direction (i.e., a direction opposing a lengthwise orientation of the plate member 254). It will be appreciated that these are merely two example configurations and that the plate member 104 and the apertures 112a, 112b could have any other suitable configuration. It will also be appreciated that three or more stud members could be implemented and three or more busbars could be connected.

Figure 4:
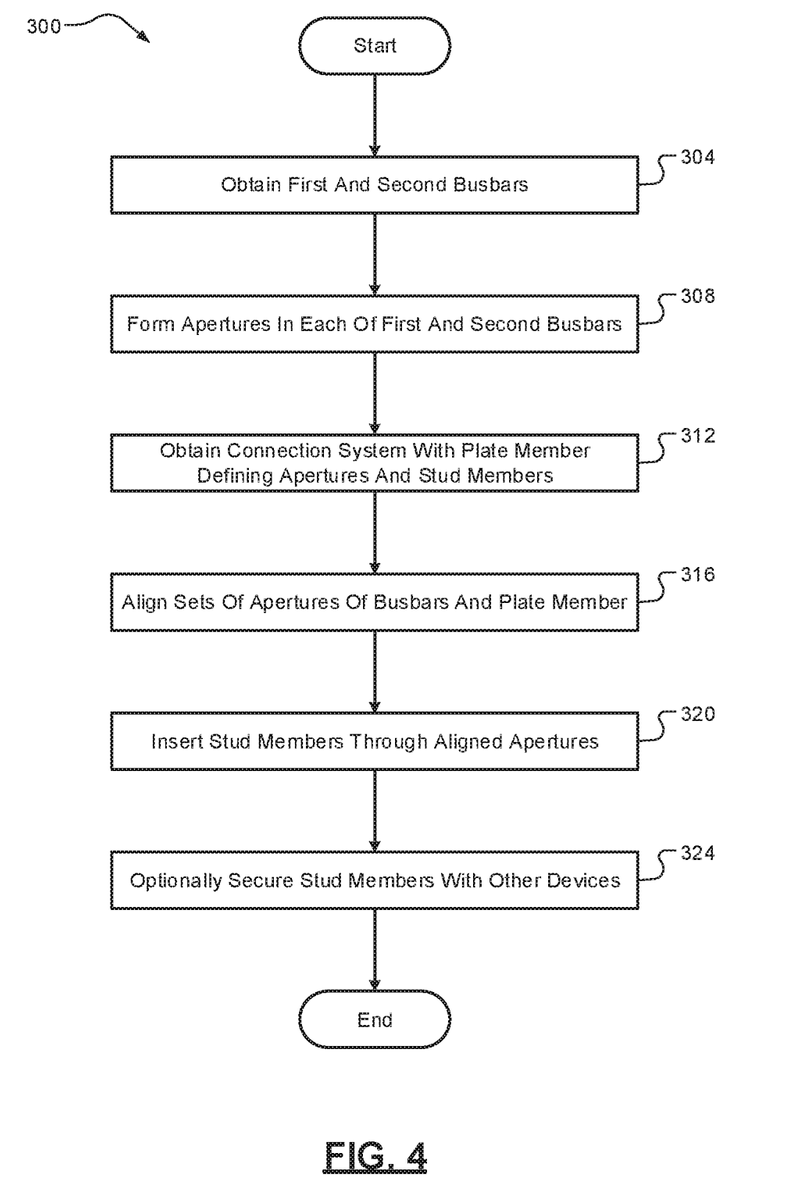
FIG. 4 is a flow diagram of an example method of connecting two or more busbars according to the principles of the present disclosure.

Referring now to FIG. 3, a flow diagram of a method 300 of assembling and installing a busbar assembly according to the principles of the present disclosure is illustrated. At 304, first and second busbars 154 are obtained. At 308, apertures 158a, 158b are formed in each of the first and second busbars 154. It will also be appreciated that these apertures 158a, 158b could be pre-fabricated. At 312, the busbar connection system 100 is obtained. This could include, for example, forming the apertures 112a, 112b through the plate member 104, but it will also be appreciated that this could be pre-fabricated. At 316, the various apertures 112a, 112b and 158a, 158b of the plate member 104 and the busbars 154 are aligned and, at 320, the stud members 108a, 108b are then securably inserted therethrough. In some embodiments, this includes adding additional connection devices 174 on an opposing exposed end of the stud members 108a, 108b at optional 324. The method 300 then ends. It will also be appreciated that, after forming the busbar assembly 150, the busbar assembly 150 could be installed, such as in the electrical system 20 of the electrified vehicle 10. This installation could be performed either by a human installer or a robotic installer, which could be preferable to decrease costs and due to the high current nature of the installation environment. For robotic installation, the busbar assembly 150 could further comprise robotic installation features 60 that can be identified and/or interacted with by an end effector 40 of a robotic installer 50. Non-limiting examples of the robotic installation features 60 include scannable barcodes, numerical identifiers, graspable members, and slots).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A busbar connection system, comprising:
a plate member formed of a first material having a higher tensile strength than both a second material forming a first busbar and a third material forming a second busbar and defining only first and second apertures; and
first and second stud members securely inserted through the first and second apertures of the plate member, respectively, the first and second stud members being configured to be securely inserted through first and second apertures, respectively, in each of the first and second busbars,
wherein the first and second stud members mitigate rotational movement between the first and second busbars when connected, and wherein the plate member defines a substantially square shape and the first and second apertures are arranged in two diagonally opposing corner regions of the plate member such that the first and second stud members further mitigate rotational movement between the first and second busbars when connected.

2. The busbar connection system of claim 1, wherein the second and third materials are aluminum or copper.

3. The busbar connection system of claim 1, wherein the first material is stainless steel.

4. An electrical system of an electrified vehicle, the electrical system comprising the busbar connection system of claim 1.

5. A busbar connection method, comprising:
providing a plate member formed of a first material having a higher tensile strength than both a second material forming a first busbar and a third material forming a second busbar, and defining only first and second apertures; and
providing first and second stud members securely inserted through the first and second apertures of the plate member, respectively, the first and second stud members being configured to be securely inserted through first and second apertures, respectively, in each of the first and second busbars,
wherein the first and second stud members mitigate rotational movement between the first and second busbars when connected, and wherein the plate member defines a substantially square shape and the first and second apertures are arranged in two diagonally opposing corner regions of the plate member such that the first and second stud members further mitigate rotational movement between the first and second busbars when connected.

6. The busbar connection method of claim 5, wherein the second and third materials are aluminum or copper.

7. The busbar connection method of claim 5, wherein the first material is stainless steel.

8. A busbar connection system, comprising:
a plate member means for formation by a first material having a higher tensile strength than both a second material forming a first busbar means and a third material forming a second busbar means and defining only first and second aperture means; and
first and second stud member means for secure insertion through the first and second aperture means of the plate member means, respectively, the first and second stud member means being for secure insertion through first and second aperture means, respectively, in each of the first and second busbar means,
wherein the first and second stud member means are further for mitigating rotational movement between the first and second busbar means when connected, and wherein the plate member means defines a substantially square shape and the first and second aperture means are arranged in two diagonally opposing corner regions of the plate member means such that the first and second stud member means further mitigate rotational movement between the first and second busbar means when connected.

9. The busbar connection system of claim 8, wherein the second and third materials are aluminum or copper.

10. The busbar connection system of claim 8, wherein the first material is stainless steel.

11. An electrical system of an electrified vehicle, the electrical system comprising the busbar connection system of claim 8.

* * * * *